United States Patent [19]

Farley

[11] 4,266,453

[45] May 12, 1981

[54] SOCKET RETAINING RING

[76] Inventor: D. Gray Farley, 5803 Holmby Ct., Cypress, Calif. 90638

[21] Appl. No.: 30,214

[22] Filed: Apr. 16, 1979

[51] Int. Cl.³ ............................................. B25B 13/00
[52] U.S. Cl. ................................. 81/177 G; 403/294; 403/408
[58] Field of Search .......................... 81/177 R, 177 G; 403/294, 324, 408

[56] References Cited

U.S. PATENT DOCUMENTS

| 1,265,341 | 5/1918 | Keller | 81/177 G UX |
| 2,110,397 | 3/1938 | Kangas | 81/177 G UX |
| 2,304,038 | 12/1942 | Thompson | 81/177 G X |

Primary Examiner—James G. Smith
Attorney, Agent, or Firm—Robert E. Strauss

[57] ABSTRACT

There is disclosed a socket retaining ring for use with power driven sockets to fasten the sockets to the plug of the drive tool. The retaining ring comprises a molded, one-piece elastomeric ring having an integral, diametric pin extending from one side substantially across the span of the ring. The retaining ring is used with sockets which have a pinned interconnection to the plug of the drive tool by inserting the flexible diametric pin of the ring into the retaining hole and seating the ring in the peripheral groove about the socket.

8 Claims, 3 Drawing Figures

SOCKET RETAINING RING

BACKGROUND OF THE INVENTION

Large diameter, power driven sockets are commonly secured to the drive plug of the power drive tool by inserting a steel pin into aligned bores between the socket and drive plug. The socket is commonly provided with a peripheral groove intersecting the bore which receives the retaining pin and an O-ring is seated in this peripheral groove to prevent accidental dislodgement of the steel pin from the aligned bores.

Since the retaining pin and O-ring are separate elements, one or both of these elements can be lost or unavailable, and workmen frequently use the tools without these elements. Workmen using the tool with the steel pin but without the retaining O-ring have been injured when the pin has dislodged and struck them. Steel pins also can jam in the receiving bores when the drive surfaces of the drive plug or of the retaining hole in the socket become worn and misaligned.

BRIEF STATEMENT OF THE INVENTION

The difficulties and hazards of the prior socket retainer pin and ring are avoided by the one-piece molded retainer ring of the invention. The retainer ring comprises a one-piece, molded elastomer ring and diametric pin. The pin is formed integrally with the O-ring and depends from one side thereof, projecting substantially across the entire diameter of the ring. Since the pin and ring are formed of a single piece, the opportunity to loose one of the retainer elements is eliminated. Since the pin and ring are formed of flexible, elastomeric material, the pin can be readily inserted into the aligned bores through the socket and plug of the drive tool by bending the pin while sliding the ring along the socket wall until the ring seats in the peripheral groove which intersects the bores through the socket. The pin is formed of a flexible elastomer and, accordingly, can not cause injury or damage. Furthermore, the ring can not be readily seated in the peripheral groove without insertion of the diametric pin since otherwise the pin would be clearly visible to the user of the tool, indicating that it has not been seated in the retaining aligned bores.

BRIEF DESCRIPTION OF THE DRAWINGS

The invention will be described with reference to the FIGURES of which.

DESCRIPTION OF PREFERRED EMBODIMENT

Figure 1:
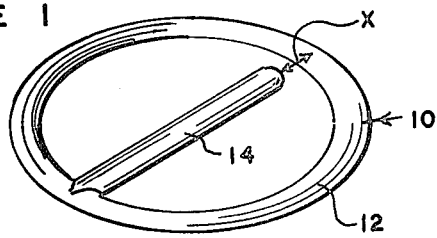
FIG. 1 is a perspective view of the retaining ring and integral diametric pin of the invention.

Referring now to FIG. 1, the invention comprises a retaining member 10 which comprises a ring 12 with a circular cross-section, similar to that of a conventional O-ring. Ring 12 is formed with an integral, dependent leg 14 which depends from one side of the ring portion of the retainer member 10. This leg also can be formed with a circular cross-section of the same diameter as that of the ring 12. The pin 14 extends diametrically across the ring 12 and terminates a distance X, short of contact with the opposite side of ring 14.

The retaining member 10 is formed of a resilient, flexible elastomer such as natural and synthetic rubbers, e.g., homo-polymers and co-polymers of acrylonitrile, butadiene and styrene, neoprene, isoprene, etc. Preferably, the elastomer material used for the fabrication of the retaining member 10 has a tensile strength at least equal to 5000 psi to provide a long service life and to avoid any failure under shear during its use. A preferred material for use in the invention comprises molded polyurethane synthetic rubber which has been found to have the desirable strength and longevity.

Figure 2:
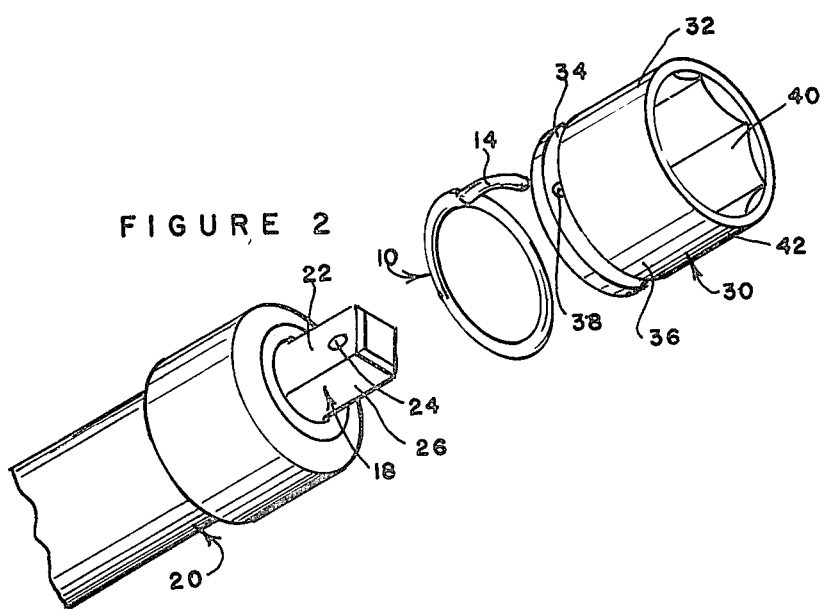
FIG. 2 is an exploded view of the assembly of a drive tool plug, socket and retaining ring.

Referring now to FIG. 2, there appears an exploded view of the assembly of a drive plug, socket and retainer member of the invention. The drive plug 18 of the drive tool 20 is of conventional construction. Typically, the drive plug has a square shank with flats 22, 26, and the like. The drive tool also typically has a transverse bore 26 for receiving a retaining pin which, heretofore, has been a steel pin.

The socket 30 is also of conventional construction with an outer cylindrical wall 32 which has a peripheral groove 34 near its drive end 36 and a transverse bore 38 which intersects the peripheral groove 34. The socket 30 has a throughbore having an interiorly broached surface 40 at the socket end 42. The socket end is conventional in construction and has 6, 8 or 12 points to fit conventional sized nuts. The throughbore of the socket is of sufficient length to provide the desired bolt clearance. The drive end of the throughbore has internal flats to fit the standard drive, typically these flats provide a square interior configuration to the internal drive end of the socket.

The retainer member 10 of the invention is used in the assembly in the illustrated manner with the flexible leg 14 insertable into the throughbore 38 which is aligned with the bore 24 of the square-shanked plug 18 of the drive unit. The retaining member of the invention is illustrated as the member is inserted or withdrawn from engagement in the aligned throughbores of the socket and plug members.

Figure 3:
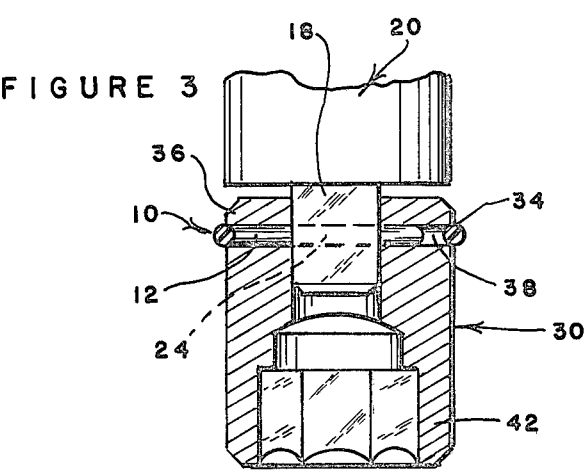
FIG. 3 is an elevational view of the drive plug, socket and retaining ring of the invention.

Referring now to FIG. 3, the assembly is shown in elevational, cross-sectional view. As there illustrated, the socket 30 is mounted to the drive plug 18 of unit 20. In this position, the rotational force is transmitted through the square-shanked drive plug directly to the internal flats of the drive end 36 of socket 30. The flexible leg 14 is seated in the aligned bore 38 of the socket and bore 24, drive plug and, in this position, restrains any axial separation of these members. The flexible leg 14 is retained in the aligned, receiving bores by the surrounding ring portion 12 of the retaining member 10 which is elastically seated in the peripheral groove 34 of the socket 30.

The retaining leg 14 and ring 12 of the retaining member are a single, integrally molded body and, accordingly, one of these elements can not be used without the other. If one attempted to insert the leg member 14 without seating the ring portion 12 about the socket, the error would be obvious since the ring portion would hang loosely from the assembly. Similarly, if the ring portion 12 were seated in the peripheral groove 34 without first inserting the leg element 14, the leg element would project from the assembly, attracting attention to the fact that it was not properly seated.

The invention has been described with reference to the illustrated and presently preferred embodiment. It is not intended that the invention be unduly restricted by this disclosure of the presently preferred and illustrated embodiment. Instead, it is intended that the invention be defined by the means, and their obvious equivalents, set forth in the following claims.

What is claimed is:

1. A retainer ring to retain power driven sockets to a plug end of a shaft by a pinned interconnection wherein said socket has a receiving hole for said plug end, said plug end and hole have mated and cooperative flat surfaces for rotational interconnection, said plug end has a radial bore and said socket has two opposite radial bores to align with the radial bore of said plug and to receive a retaining pin for their axial interconnection with a peripheral groove for O-ring pin retainers which comprises:

a one-piece, molded elastomeric O-ring of a diameter to seat in the peripheral groove of said socket and an integrally molded elastomeric diametric pin means dependent from the inside and extending across the majority of the span of said O-ring and received in said radial bore of said plug and both said aligned bores of said socket.

2. The retainer ring of claim 1 wherein said ring is molded of an elastomer having a tensile strength at least equal to 5000 psi.

3. The retainer ring of claim 2 molded of polyurethane.

4. In the combination of a shaft and detachable member wherein said member has a retaining hole to receive a plug end of said shaft and wherein said receiving hole and plug end have mated and cooperative flat surfaces for rotational interconnection and said plug end has a radial bore and said member has two aligned radial bores to align with the radial bore of said plug and to receive a retaining pin for their axial interconnection and a peripheral groove about said detachable member intersecting its radial bore, the improvement which comprises: a one-piece molded elastomeric retainer ring seated in said peripheral groove of said member and having an integrally molded elastomeric diametric pin dependent from one side of said ring, received in said two aligned radial bores of said member and said bore of plug end.

5. The combination of claim 4 wherein said member is a socket and said shaft is the drive shaft of a socket drive tool.

6. The combination of claim 5 wherein said socket drive tool is a power driven tool.

7. The combination of claim 6 wherein said power driven tool is a pneumatic drive tool.

8. The combination of claim 4 wherein said ring is molded of polyurethane synthetic rubber having a tensile strength of at least 5000 psi.

* * * * *